United States Patent
Anders et al.

(10) Patent No.: US 9,396,575 B2
(45) Date of Patent: Jul. 19, 2016

(54) ANIMATION VIA PIN THAT DEFINES MULTIPLE KEY FRAMES

(71) Applicant: Adobe Systems Incorporated, San Jose, CA (US)

(72) Inventors: Mark Anders, Scottsdale, AZ (US); Joshua Hatwich, Chicago, IL (US); James Doubek, Sunnyvale, CA (US); Scott Evans, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 447 days.

(21) Appl. No.: 13/886,014

(22) Filed: May 2, 2013

(65) Prior Publication Data

US 2013/0293555 A1    Nov. 7, 2013

Related U.S. Application Data

(60) Provisional application No. 61/641,713, filed on May 2, 2012.

(51) Int. Cl.
  *G06T 13/00* (2011.01)
  *G06T 13/80* (2011.01)
(52) U.S. Cl.
  CPC .............. *G06T 13/80* (2013.01); *G06T 13/00* (2013.01); *G06T 2213/08* (2013.01)

(58) Field of Classification Search
None
See application file for complete search history.

(56) References Cited

U.S. PATENT DOCUMENTS

| | | | |
|---|---|---|---|
| 2005/0156932 A1* | 7/2005 | Vienneau et al. | 345/473 |
| 2010/0281382 A1* | 11/2010 | Meaney et al. | 715/723 |
| 2012/0063747 A1* | 3/2012 | Braun et al. | 386/280 |
| 2012/0210231 A1* | 8/2012 | Ubillos et al. | 715/723 |
| 2012/0210262 A1* | 8/2012 | Sheeler | G06T 13/20 715/765 |
| 2013/0097552 A1* | 4/2013 | Villaron et al. | 715/781 |

* cited by examiner

*Primary Examiner* — Peter Hoang
(74) *Attorney, Agent, or Firm* — Kilpatrick Townsend & Stockton LLP

(57) ABSTRACT

Disclosed are embodiments for defining animation of content. One exemplary embodiment calls for receiving an indication of a location for an animation pin on a timeline associated with a content editing environment configured for editing content. The embodiment involves recording a state of the content in response to receiving the indication of the location for the animation pin, the recorded state of the content associated with a first time and comprising a value associated with a property. Additionally, the embodiment involves receiving a user input indicating an edited state of the content at a second time different from the first time, the second state associated with the location of the animation pin on the timeline and defining an animation based at least in part on the recorded state and the edited state of the content.

19 Claims, 12 Drawing Sheets

ANIMATION VIA PIN THAT DEFINES MULTIPLE KEY FRAMES

RELATED APPLICATIONS

This application claims priority to Application No. 61/641,713 entitled "Computer-Implemented Methods and Systems for Animation Via Pin that defines Multiple Key Frames" filed on May 2, 2012.

FIELD

This disclosure relates generally to computer software and more particularly relates to the creation, modification, use, and distribution of electronic content.

BACKGROUND

Conventional techniques for creating animation of objects involve defining at least two key frames over a timeline to denote a start point and an end point of animation and defining a value of a property associated with the objects at each key frame. Many types of properties associated with the objects may be animated, thereby providing the artist with a high degree of flexibility. However, conventional techniques require that each property change be defined by first specifying the key frames between which the property value is changed. Thus, these conventional techniques can be cumbersome and leave the artist or other animation creator susceptible to making mistakes.

SUMMARY OF THE INVENTION

Disclosed are embodiments for defining an animation of content in an editing environment. The embodiment involves receiving an indication of a location for an animation pin on a timeline associated with the content editing environment and recording a state of the content where the recorded state of the content is associated with a first time and comprises a value associated with a property. Additionally, the embodiment involves receiving a user input indicating an edited state to the content at a second time that is different from the first time. The second time is associated with the location of the animation pin on the timeline. Then, the embodiment involves defining the animation based at least in part on the recorded state and the edited state of the content.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
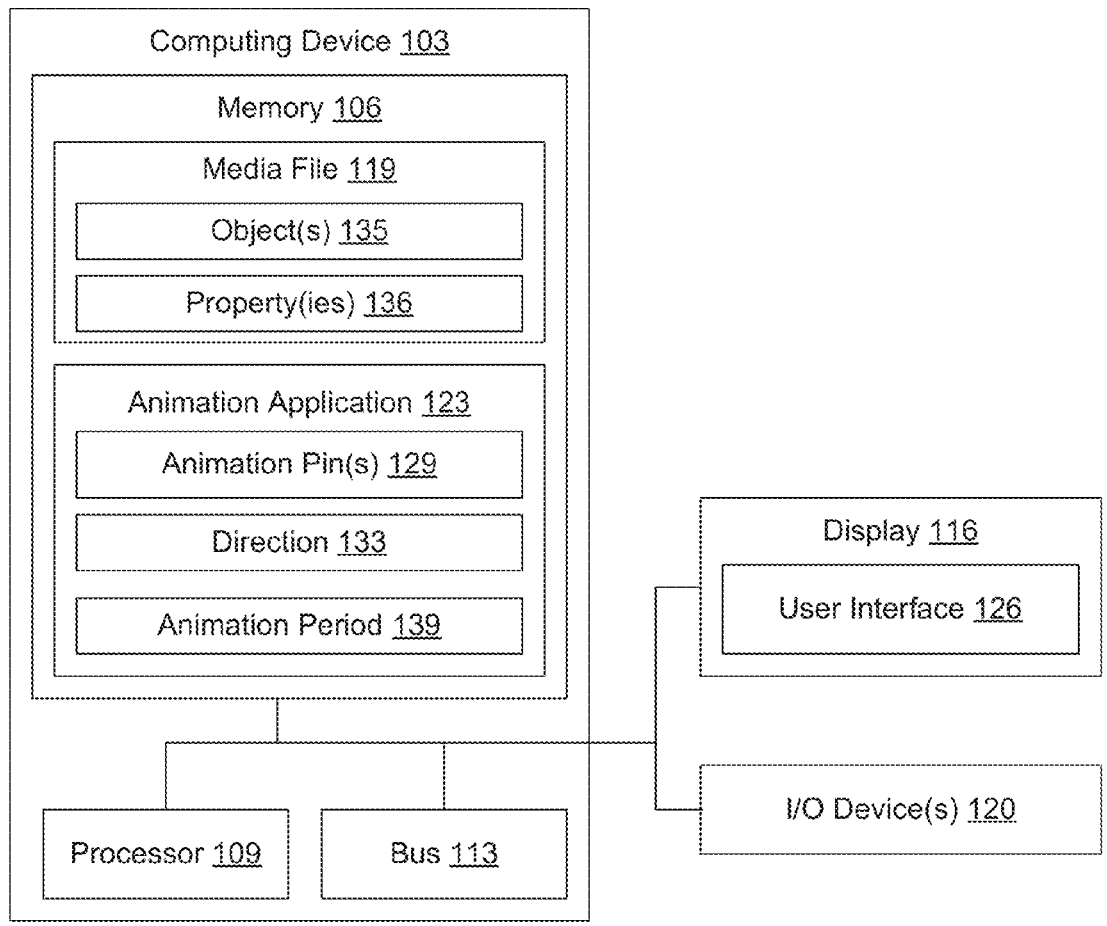
FIG. 1 is a block diagram depicting exemplary computing devices in an exemplary computing environment for implementing certain embodiments.

Methods and systems are disclosed for creating animations involving objects using intuitive animation features. In one example, a developer may create an animation sequence to be executed by simply providing input to identify a location on a timeline where the animation occurs and by providing input to define the animation to be performed. In particular, the developer may create the animation sequence without a need to separately or manually define a state of objects in two key frames of the animation. The animation can be specified based on a currently selected state and input identifying another time and object changes to be associated with that other time. For example, if an artist and/or content creator is viewing or has already selected a particular state of an object or point in a timeline of an animation environment, he or she can create a new animation by selecting a command, such as "place pin" command, to place a pin along a timeline. In response, an animation application may record a state of the object included in the animation environment creating a recorded state. The user may then make one or more changes to the state of the objects to create an edited state. For instance, the changes to the state of the objects may include changing one or more values of properties associated with the objects. The animation application then uses the information to define and/or create the animation. This may involve defining the animation from the recorded state to a edited state, or vice versa, by applying the changes provided by the user.

The user is able to simply specify the animation because information about one of the animation's end points (starting or ending) is identified based on what is currently being displayed or edited when the user initiates the animation defining process. Thus, when the user initiates the process, the state associated with what is presently-displayed for example on the editing canvas and the associated time, e.g., time on a timeline, are recorded as the "recorded state." The user then specifies information about the other end point, specifying the time, e.g., a second time point on the timeline, and specifying changes or changed values to create the edited state. As a specific example to illustrate certain exemplary aspects of certain embodiments, consider a box-shaped graphical object displayed on a left side of an editing canvas in a state associated with time point at the 2-second time from the start of the content's timeline. A user may initiate an animation defining process by identifying a time point at the 4-second time from the start of the timeline and specify a position for the box-shaped object on the right side of the editing canvas. Based on this simple input, the application can define an animation from the recorded state (time 2, left position) to the edited state (time 4, right position).

One exemplary embodiment provides an animation pin that simultaneously defines one or more animation periods for objects and defines changes in property values of the objects that occur within the animation period(s). In one embodiment, the user may indicate a location on a timeline to place an animation pin to define a direction and duration of the animation. The animation pin may mark the location for the end of the animation or the beginning of the animation based on the indicated direction. Upon the placement of the animation pin or other command initiating the animation defining process, the relevant properties of the object may then be recorded which will be the recorded state. If the pin is placed before the time of the play head, the recorded state will be the start of the animation and the edited state will be the end of the animation. Conversely, if the pin is placed after the time of the play head, the edited state will be the start of the animation and the recorded state will be the end of the animation.

The user may indicate an edited state of the objects in the animation by indicating a change in property value associated with each one of the objects. In one embodiment, the change in property value may be indicated via one or more gestures from a mouse and/or other input device. In this example, the user may indicate a property value at the start of the animation such as, for instance, a value for a color of the object. When the animation executes, the color of the object is defined by the indicated value at the start of the animation period. As the animation advances, the color (e.g., values for one or more of color hue, saturation, etc. of the color) of the object is gradually adjusted back to that of the original state by the time the play back reaches the animation pin. For example, the color may be adjusted linearly over the duration period to return to the original state. Therefore, the user may define an animation without having to individually specify a property value at each key frame.

Certain embodiments described herein provide for a user to simultaneously define two time values and two property values for the animation without a need to separately define key frames and individually specify property values at each of the key frames. For example, by defining an animation period the user may specify both a start time value and an end time value for the animation. Additionally, the state of the objects is recorded upon the placement of the animation pin. For example, one or more properties of the objects that define the state of the object is recorded. Thus, when the user adjusts one of the property values of an object to create the edited state, both the start and the end point for the property values are defined. Accordingly, animation of objects may be defined without individually establishing two separate time values for a key frame and specifically defining property values at both the start time value and the end time value of the key frame.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 is a block diagram depicting an exemplary computing device in an exemplary computing environment for implementing certain embodiments. The methods and systems disclosed herein are also applicable on other computing systems and environments. The environment shown in FIG. 1 includes a computing device 103 having a memory 106, a processor 109, a bus 113, a display 116, and a plurality of input/output devices 120.

As used herein, the term "device" refers to any computing or other electronic equipment that executes instructions and includes any type of processor-based equipment that operates an operating system or otherwise executes instructions. A device will typically include a processor 109 that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tables, laptop computers, Internet appliances, other processor-based devices, and television viewing devices. The exemplary computing device 103 may be used as special purpose computing devices to provide specific functionality offered by applications and modules.

As used herein, the term "application" refers to any program instructions or other functional components that execute on a device. An application may reside in the memory 106 of a device that executes the application. As is known to one of skill in the art, such applications may be resident in any suitable computer-readable medium and execute on a suitable processor. For example, as shown the device 103 has a computer-readable medium such as the memory 106 coupled to the processor 109 that executes computer-executable program instructions and/or accesses stored information. Such a processor 109 may include a microprocessor, an ASIC, a state machine, or other processor, and can be of any number of computer processors. Such processors include, or may be in communication with, a computer-readable medium which stores instructions that, when executed by the processor, cause the processor to perform the steps described herein.

As used herein, the term "file" refers to one or more electronic files that are maintained and organized by a file system. In one embodiment, files organized by the file system may be abstractions that do not directly correspond to any particular physical storage arrangements such as disk drives, portable storage media, etc. Each file may include a file name, a unique identifier, and a data object reference, and/or other data. In one embodiment, the file name may correspond to a human-readable character string that identifies the contents of the file and the unique identifier may correspond to a character string that uniquely identifies the file across the file system. Additionally, the data object reference may identify a data object associated with the file that is stored in the memory 106.

The memory 106 represents a computer-readable medium that may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In one embodiment, the memory 106 includes one or more media files 119, an animation application 123, and/or other data. The media files 119 may be a listing of pointers that each point to a location in of a media file, such as, for example a video file, an image file, and/or other files that include visually depicted objects. Each media file 119 may include objects 135 that are depicted within frames and/or images that comprise the media file 119. Additionally, the objects 135 may be associated with properties 136 that describe various aspects of the object 135, such as for example, color, thickness, location, and/or other properties 136. The animation application 123 renders a user interface 126 for creating an animation for one or more objects included in the media file 119. In one embodiment, the animation application 123 receives an indication by the user manipulating the user interface 126 for a location of an animation pin 129. In response, the animation application 123 may render a visual representation of the animation pin 129 on the user interface 126 at the indicated location. Additionally, the user may indicate a direction 133 of the animation, a property 136 and a value of the property 136 to be changed during the animation, and an animation period 139. In response, the animation application 123 may execute the animation with respect to the location of the animation pin 129 in the indicated direction 133 by changing the value of the indicated property 136 over the animation period 139, as will be described.

Figure 2:
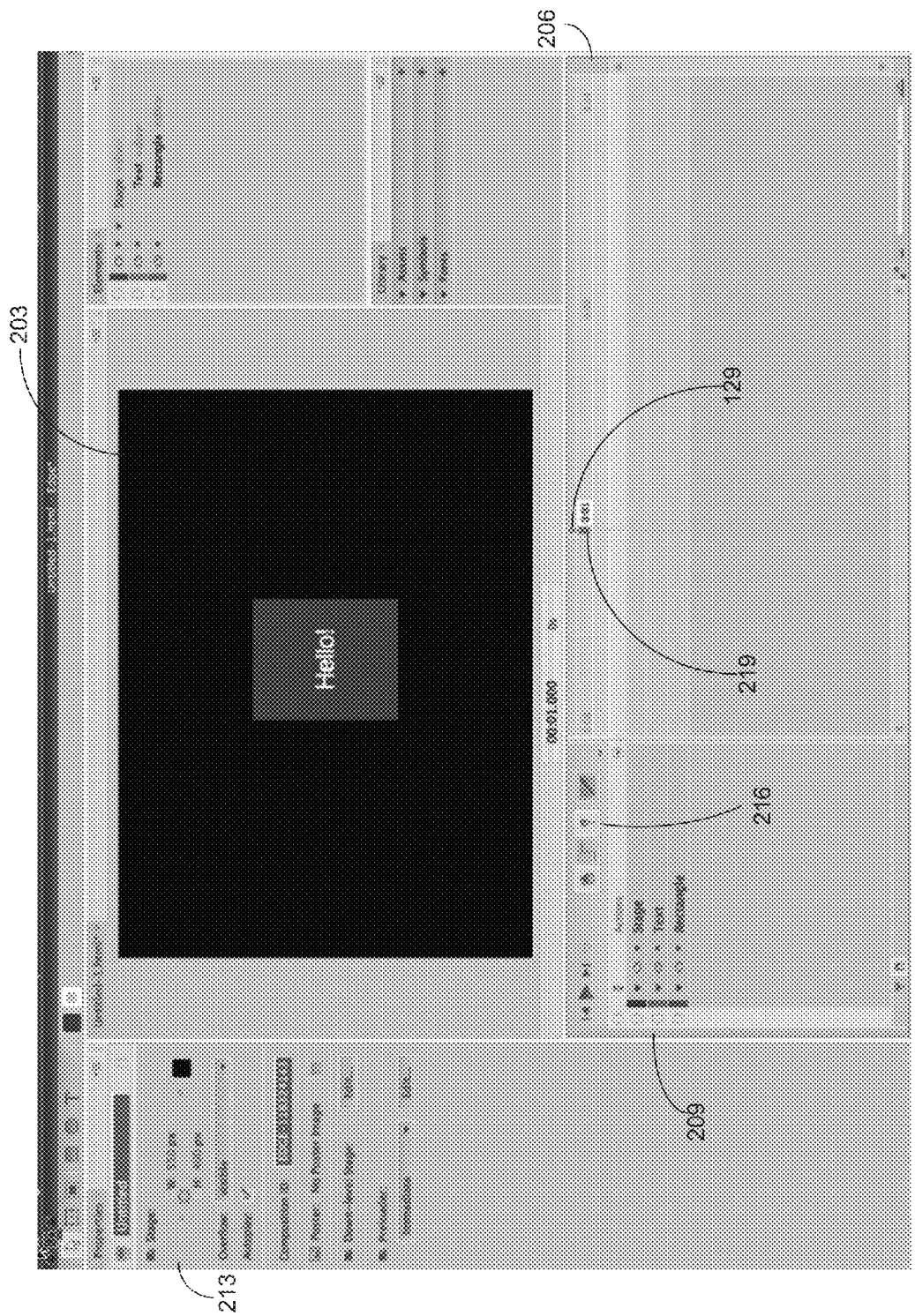
FIG. 2 depicts an exemplary embodiment of a user interface depicting an animation environment rendered by an animation application on a display associated with a computing device.

FIG. 2 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, and an animation pin 129. As shown in FIG. 2, the object panel 203 includes a stage object, a text object, and a rectangle object. The listing of objects 209 includes the objects found in the object panel 203 (i.e., the state object, the text object and the rectangle object). The time line 206 represents a period of time during which the object may be animated. In this example, the time line 206 is scaled to the second in denomination. Additionally, the time line 206 may be configurable to expand and shrink the period of time that appears within the time line 206. The properties panel 213 depicts a number of configurable properties associated with each one of the objects depicted in the object panel 203. In this example, the properties associated with the stage object are depicted in the properties panel 213. The animation pin selector 216 may be invoked by the user to place the animation pin 129 at a location on the time line 206. Additionally, the play head 219 indicates a current play back position on the time line 206. As shown in FIG. 2, the user provided an input to place the animation pin 129 at the 1-second mark on the time line 206. In one embodiment, the animation application 123 may record the property values of the objects in the object panel 203 in response to the placement of the animation pin 129 on the time line 206.

Figure 3:
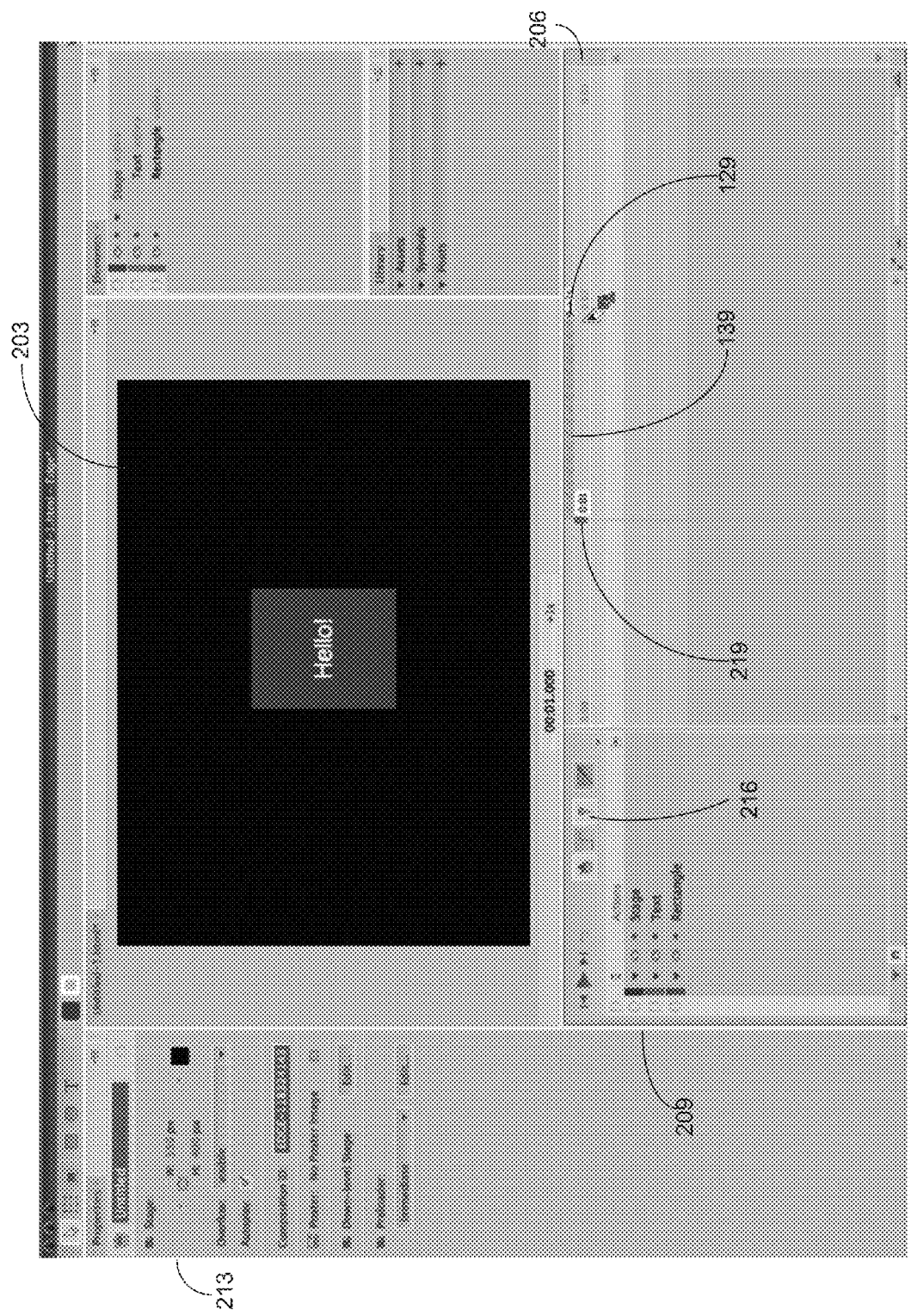
FIG. 3 depicts an exemplary embodiment for receiving one or more user inputs via a user interface to provide a direction and animation period for the animation.

FIG. 3 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, and an animation pin 129. Additionally, FIG. 3 includes animation period 139 as specified by input from the user. The user may adjust the length of the animation period 139 via the mouse and/or touch device. In one embodiment, the user may also indicate via a mouse, a touch device, and/or other input device the direction 133 (FIG. 1) and the animation period 139 for the animation of one or more objects depicted in the object panel 203. In this example, the user indicated that the animation is to occur before the point in the time line 206 indicated by the animation pin 129 for the span of an animation period 139. For instance, the animation occurs between the play head 219 and the animation pin 129. In some embodiments, the direction 133 of the animation may be indicated graphically within the animation period 139 on the time line 206 such as by a set of arrows, a color, and/or other visual indicator. For example, the direction 133 may be indicated by one or more backward arrows originating from the location of the animation pin 129 and advancing to the play head 219. As indicated by the direction 133, the user may define the animation backwards where a property value of one or more of the objects will be adjusted by the user (i.e. creating the edited state) such that the animation application 123 modifies the adjusted property value to return to the original recorded state, over the course of the animation, as will be described.

Figure 4:
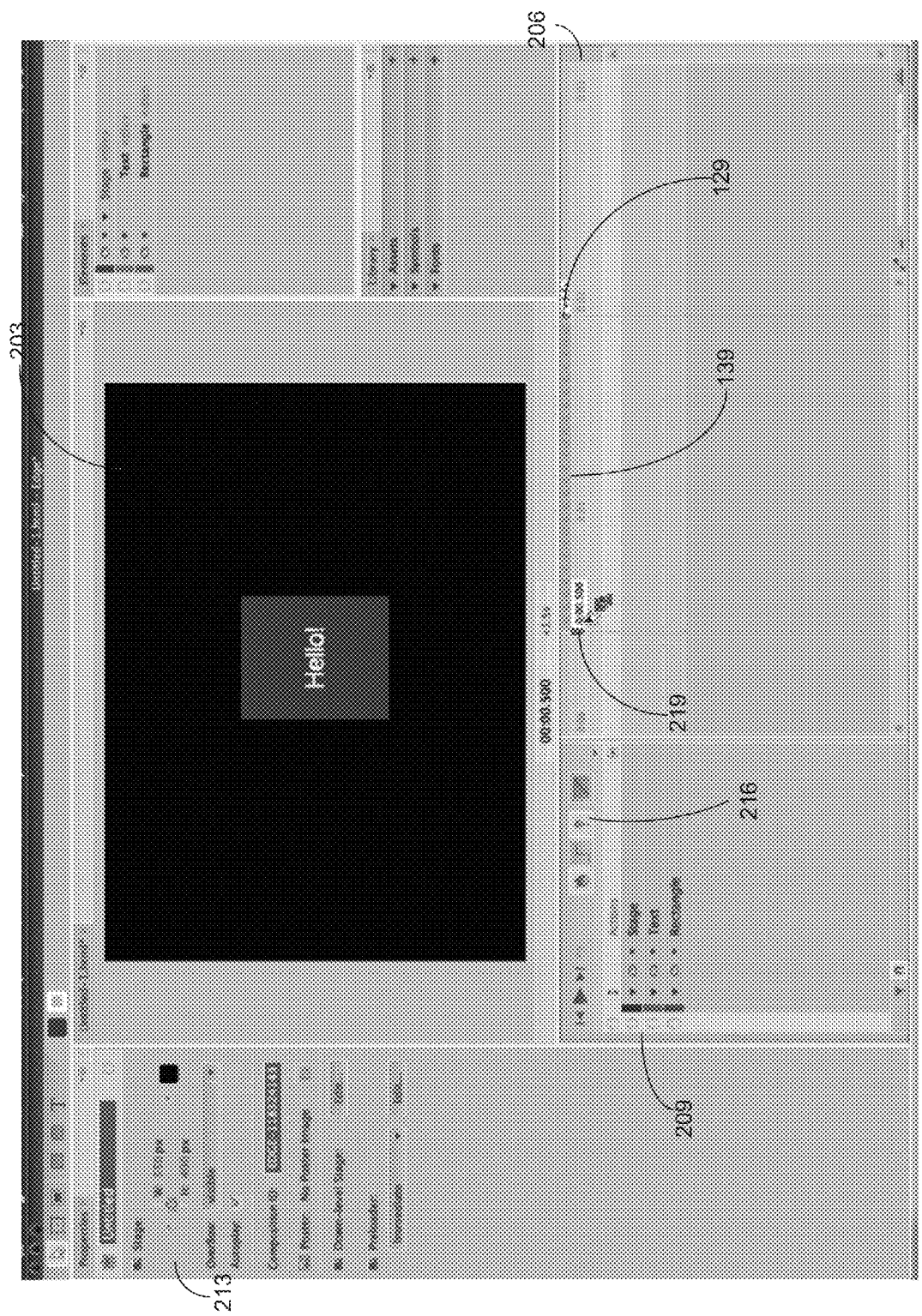
FIG. 4 depicts an exemplary embodiment for receiving one or more user inputs via a user interface to manipulate an animation period.

FIG. 4 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, and the animation period 139. In one embodiment, the user may manipulate the duration of the animation period 139 by indicating a new animation period 139 by the mouse, touch device, and/or other input device. As shown in FIG. 4, the user has indicated that the animation period 139 last for 1.5 seconds.

Figure 5:
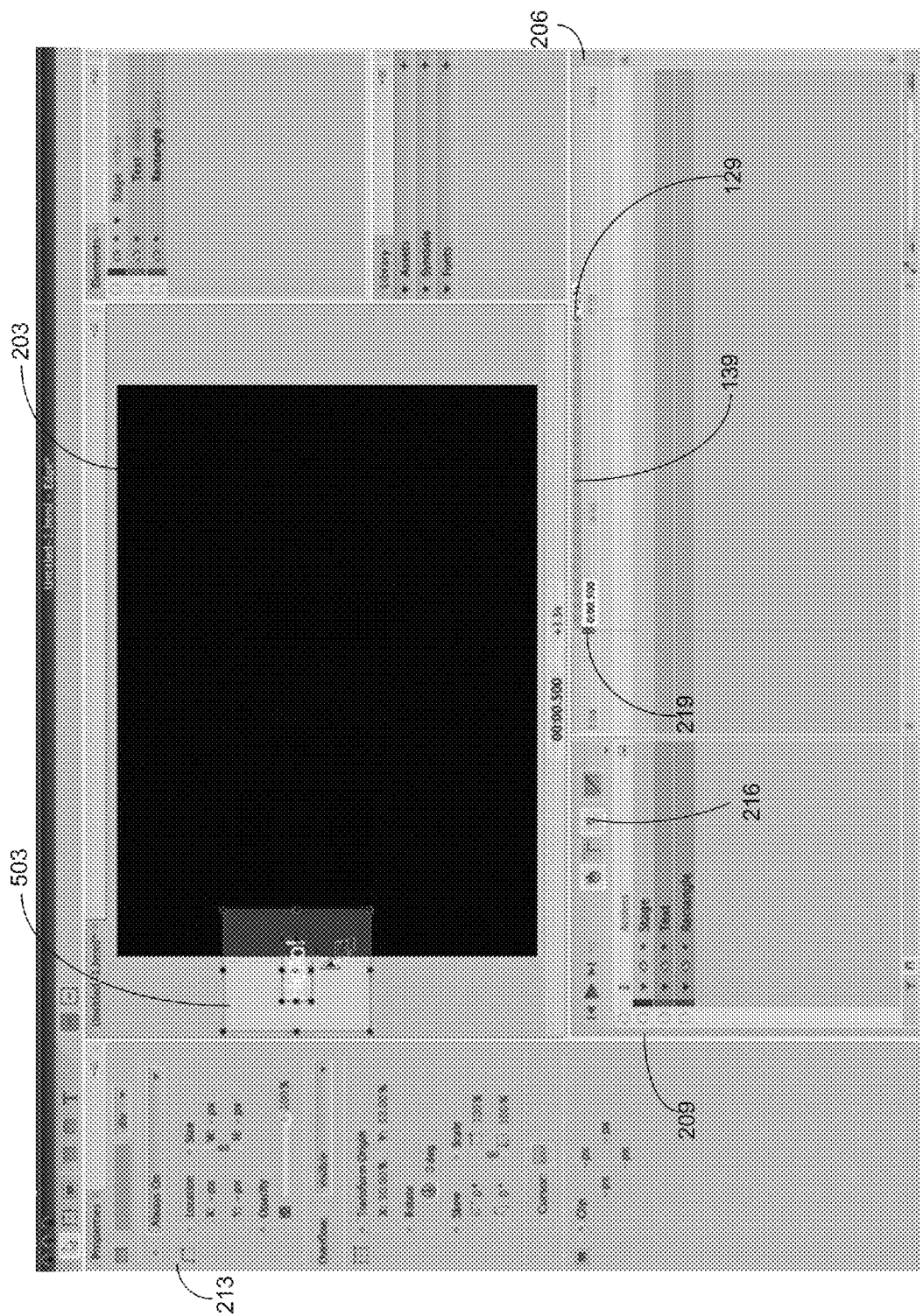
FIG. 5 depicts an exemplary embodiment for receiving one or more user inputs via a user interface to provide changes to a state of at least a subset of objects in the animation environment.

FIG. 5 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, and the animation period 139. Additionally, FIG. 5 includes animated objects 503. In one embodiment, the user may indicate via a mouse and/or touch device, a change in a property value associated with one or more objects included in the object panel 203. For example, the user may adjust an x-axis location of the objects in the object panel 203 by dragging the animated objects 503, via a mouse and/or a touch device, to a desired starting location on the x-axis. As shown in FIG. 5, the desired starting location on the x-axis starts the animated objects 503 outside of the object panel 203. Additionally, as discussed before, the user previously indicated that the direction 133 of the animation is backwards between the play head 219 and the animation pin 129. Thus, the animation being defined by the user will end with the animated objects 503 having property values that correspond to the previously recorded property values at the time of the placement of the animation pin 129. Further, the animation being defined by the user will begin with the animated objects 503 having the edited property values, as shown in FIG. 5. Accordingly, the animated objects 503 may appear from outside of the viewing area of the object panel 203 at the start of the animation and may be linearly adjusted to the middle of the viewing area of the object panel 203 at the end of the animation as defined by the previously recorded state.

Figure 6:
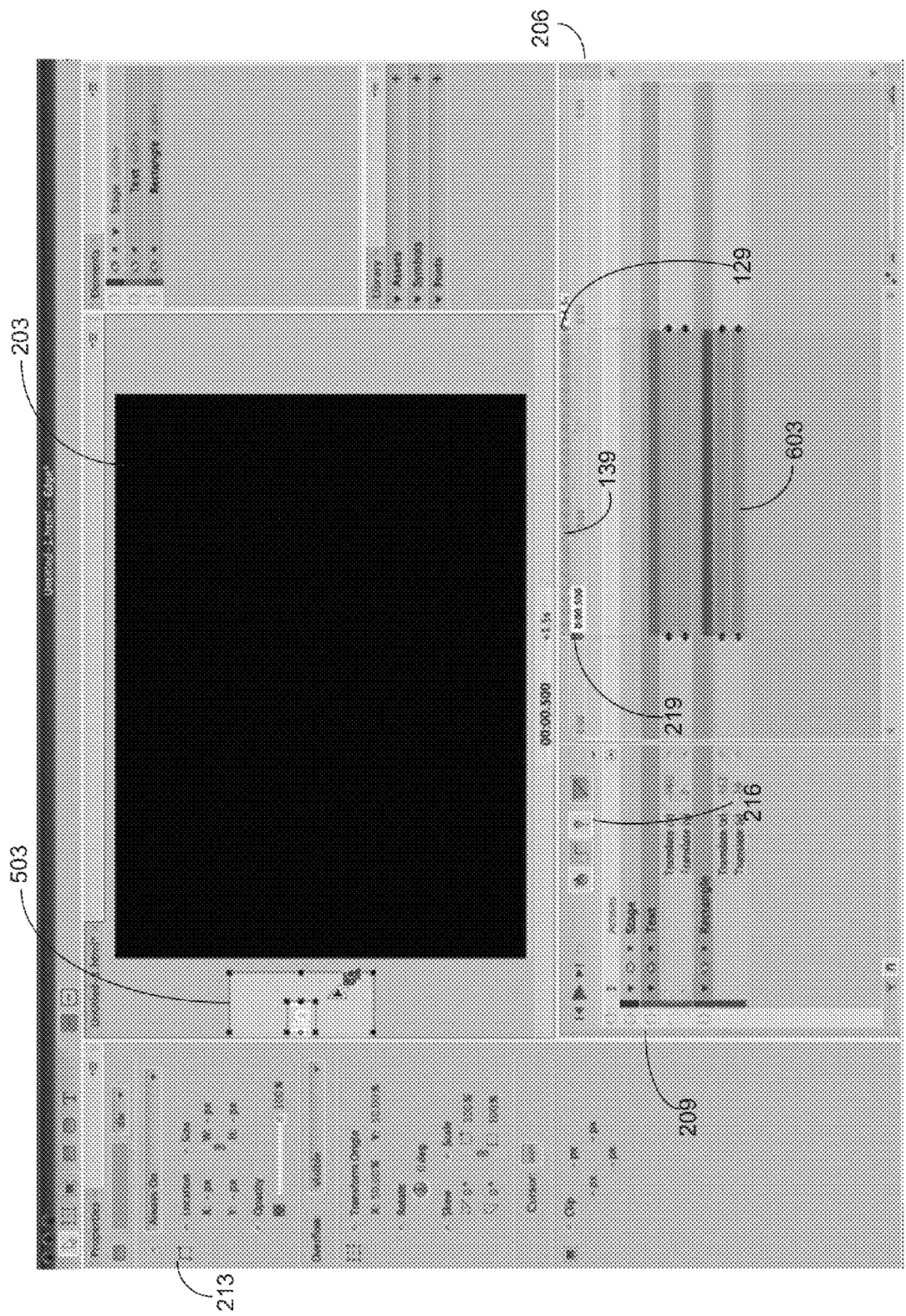
FIG. 6 depicts an exemplary embodiment for depicting one or more changes to values of properties associated with the objects on a timeline associated with the animation environment.

FIG. 6 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, the animation period 139, and the animated objects 503. Additionally, FIG. 6 includes property notations 603. In one embodiment, the animation application 123 may generate the content of the property notations 603 upon receiving the changes to the property values of the animated objects 503 (i.e. the edited state), as discussed above with respect to FIG. 5. For example, the user may request to save the edited state (i.e., the x-axis value) of the animated objects 503 by manipulating the user interface 126. In response, the animation application 123 populates the time line 206 with the property notations 603 for each object in the listing of objects 209. In one embodiment, the animation application 123 includes a change in a property value for each one of the animated objects 503 in the property notations 603 as defined over the animation period 139.

As an example, the x-axis value of the animated objects 503 was adjusted as discussed above with respect to FIG. 5. The property notations 603 populated by the animation application 123 define the change in the property values of each of the properties 136 effected by the animation indicated by the user. For example, at the starting point of the animation period 139, the x-axis value of the animated objects 503 is indicated in the property notations 603 to correspond to the x-axis location as indicated by the user. Each one of the animated objects 503 is listed in the time line 206. Additionally, for each object, the adjusted properties are included in the property notations 603. In one embodiment, a small adjustment to the value of the y-axis parameter of the animated objects 503 is depicted. For example, a slight change in the y-axis location may have occurred when the user adjusted the x-axis values of the animated objects 503 via the mouse, as can be appreciated. Further, the property notations 603 depicted in the timeline 206 include an animation period 139 that occurs between the time periods designated by the play head 219 and the animation pin 129 for each adjusted property 136 of the animated objects 503. For instance, an animation period 139 for both of the x-axis property 136 and the y-axis property 136 is included in the property notations 603. In one embodiment, each one of these animation periods 139 may be individually configurable, as can be appreciated.

Figure 7:
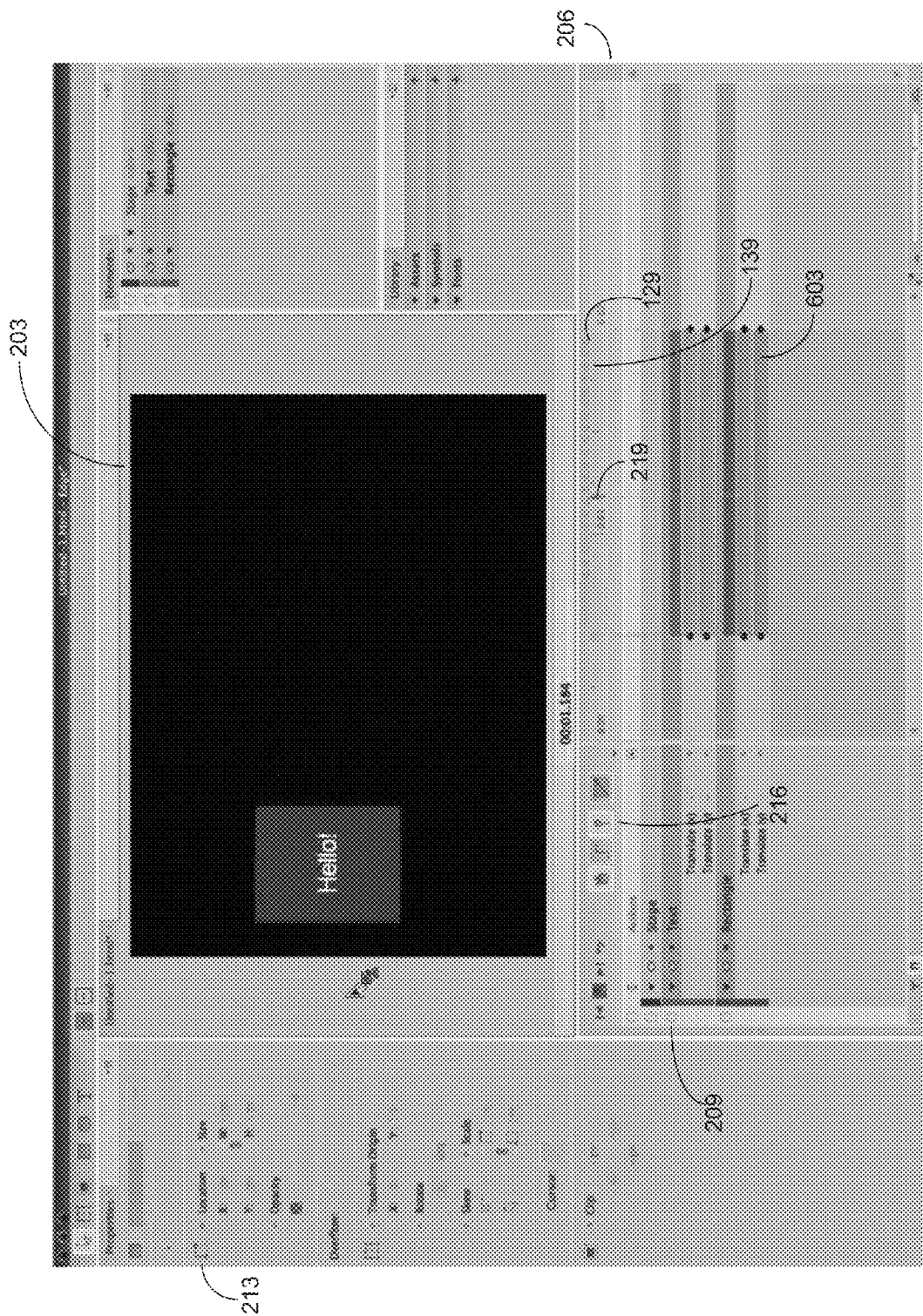
FIG. 7 depicts an exemplary embodiment for an animation being executed in the animation environment.

FIG. 7 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, the animation period 139, and the property notations 603. Additionally, FIG. 7 depicts the play head 219 as it advances down the time line 206. FIG. 7 shows a screenshot of the animation defined by the user being played back. In one embodiment, the user may have invoked a play button using the mouse and/or touch device, or struck an appropriate key on a keyboard to issue the play command. In response, the animation application 123 advances the play head 219 and executes the animation from the start of the animation period 139 at the animation pin 129 to the end. Accordingly, the objects are adjusted from the edited state to the recorded state. In this example, the adjusted property values of the animated objects 503 (FIG. 1) are modified back to its recorded state in a uniform and/or linear manner over the span of the animation period 139. For instance, the original state may have been recorded during the initial animation pin 129 placement, as previously discussed. In this example, the animated objects 503 are shifted linearly along the x-axis to the original location as shown in FIG. 2.

Figure 8:
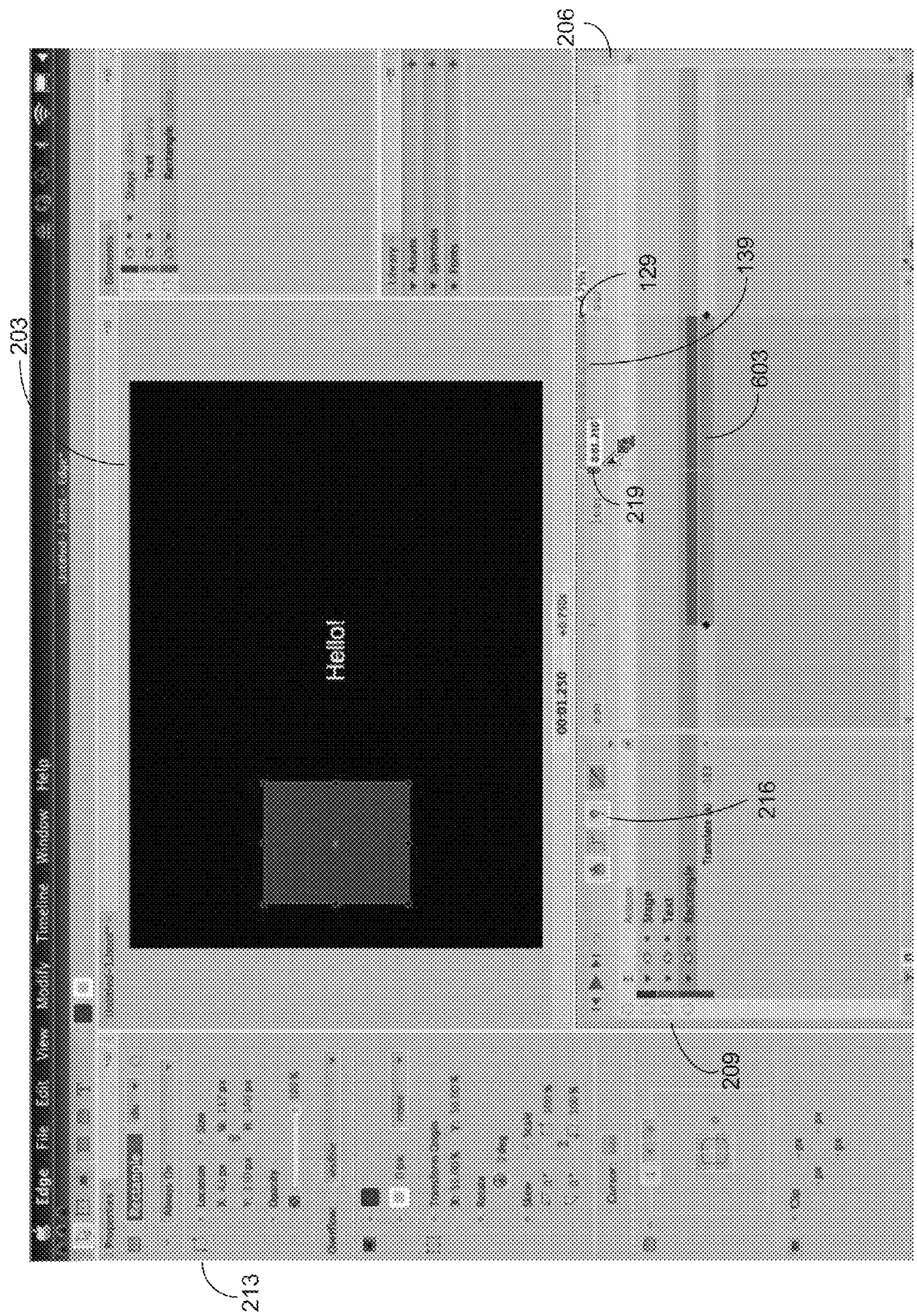
FIG. 8 depicts an exemplary embodiment for receiving one or more user inputs to adjust an animation period associated with one or more objects in the animation environment.

FIG. 8 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, the animation period 139, and the property notations 603. In this example, the property panel 213 reflects the properties of the rectangle object that may be adjusted to create the animation. As shown in FIG. 8, the user may individually modify the animation periods 139 of each one of the objects depicted in the object panel 203. For example, the user may adjust, modify, and/or delete the animation period 139 for an object in the property notations 603 via a mouse and/or other input device. Additionally, the user may create a new animation for each object by placing a new animation pin 129 via the animation pin selector 216. In the example shown in FIG. 8, the user removed the animation for the text object and the animation of the y-axis property of the rectangle object as seen by the removal of the animation periods in the property notations 603. Thus, the text object appears with the original values for the property 139 in the object panel 203 (i.e., the x-axis property 139 is adjusted to the original state).

As shown in this example, the user may individually create an animation for the objects in the object panel 203. For instance, the user may invoke the animation pin selector 216 to place an animation pin 129 on the time line 206 and indicate the direction 133 (FIG. 1) of the animation to occur in the animation period 139. Accordingly, the animation application 123 may record a state of the objects (i.e., property values of the objects) at the time of the pin placement. Here, the user has indicated that the direction 133 of the animation is backward. Thus, the animation to be defined will occur such that the property values of selected objects at the start of the animation will correspond to an edited state of the objects and the property values of the selected objects at the end of the animation will correspond to the recorded state of the object.

Figure 9:
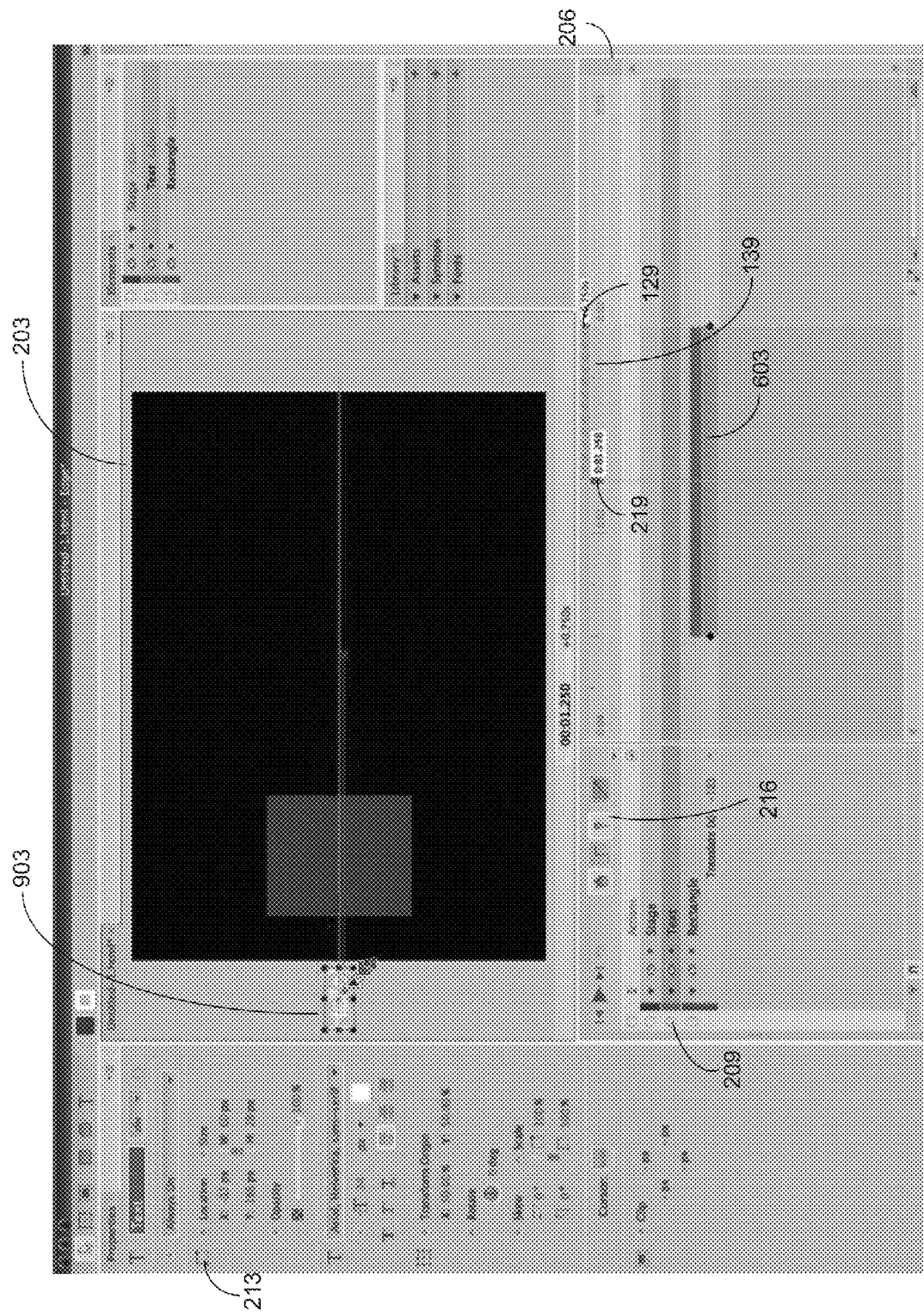
FIG. 9 depicts an exemplary embodiment for receiving one or more user inputs to adjust a state of one of the plurality of objects included in the animation environment.

FIG. 9 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, the animation period 139, and the property notations 603. Additionally, FIG. 9 includes a text object 903. As shown in FIG. 9, the user may adjust a property value of the objects in the object panel 203. For example, the user may adjust an x-axis value of a text object 903 by dragging the text object 903 to the adjusted x-axis location as shown in FIG. 9 via a mouse and/or other input device.

Figure 10:
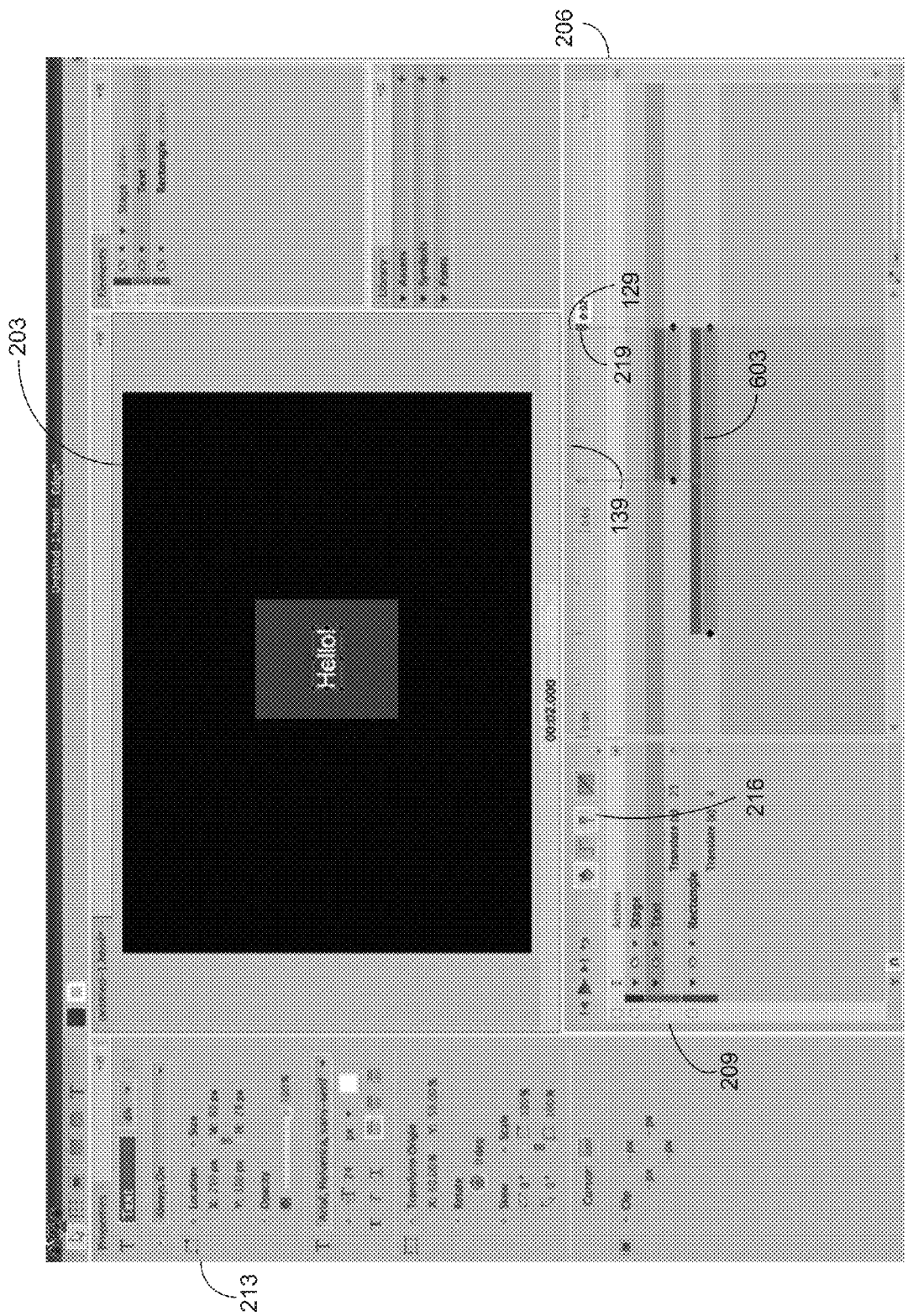
FIG. 10 depicts an exemplary embodiment for receiving one or more user inputs to individually adjust the state and animation periods of objects in the animation environment.

FIG. 10 shows one example of a user interface 126 according to certain embodiments of the present disclosure that is rendered on the display 116 (FIG. 1). In this example, the user interface 126 depicts an object panel 203, a time line 206, a listing of objects 209, a property panel 213, an animation pin selector 216, a play head 219, an animation pin 129, the animation period 139, and the property notations 603. As shown in FIG. 10, the property notations 603 include the animation period for the text object 903 (FIG. 9) that the user previously established. Thus, when the animation of the objects (i.e. the text object and the rectangle object) in the object panel 203 is executed, the rectangle object and the text object both start on the left side and outside of the viewing area of the object panel 203 as indicated by the edited state of the objects. The objects then move to the center position, as indicated by the recorded state which was previously recorded during the pin placement. For example, the objects may be in the center position when the animation ends (i.e. the play head 219 is at the location on the time line 209 that corresponds to the animation pin 129). This animation application 123 (FIG. 1) may render the animation such that the objects transition to the center position at a uniform and/or linear rate over the span of the animation period for each object. In this example, the animation application 123 (FIG. 1) may move the rectangle object at a lower rate of speed than the text object because the animation period for the rectangle object is longer than the text object, as indicated by the property notations 603.

Figure 11:
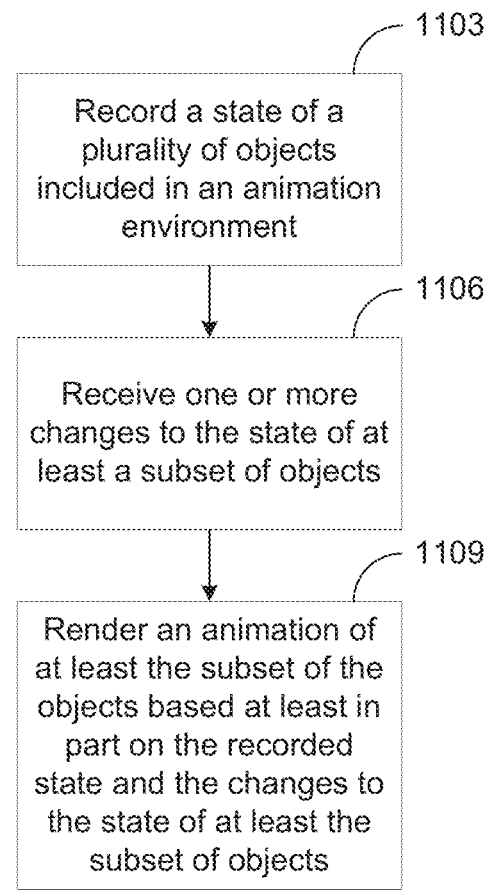
FIG. 11 is a flowchart depicting an example of the operation of a portion of the computing device according to certain embodiments.

FIG. 11 is a flowchart that provides one example of the operation of a portion of the computing device 103 according to certain embodiments. It is understood that the flowchart of FIG. 11 provides merely an example of the many different types of functional arrangements that may be employed to implement the operation of the portion of the computing device 103. As an alternative, the flowchart of FIG. 11 may be viewed as depicting an example of steps of a method implemented in the client device 106 according to one or more embodiments.

Beginning with step 1103, the computing device 103 records a state of a plurality of objects included in an animation environment. In one embodiment, the objects are associated with a media file 119 and the animation environment is configured to animate at least a subset of the objects. Recording the state of the plurality of objects comprises recording values of one or more properties 136 of the plurality of objects to define the recorded state of the objects. For example, the properties 136 may include an x-axis value and a y-axis value of the respective object on a grid. The properties 136 may also include a font, a size of a font, a type of font, and/or any other characteristic associated with text.

Next, in step 1106, the computing device 103 receives one or more changes to the state of the at least a subset of the plurality of objects included in the animation environment. In one embodiment, the computing device 103 may receive the changes to the state via one or more input devices. For example, a user may provide input to change a value of a property 136 associated with an object in the animation environment. For instance, the user may change a x-axis value, a y-axis value, a font type, a font color and/or any other property 136 associated with an object in the animation environment to define the edited state of the objects.

Then, in step 1109, the computing device 103 renders an animation of at least the subset of the plurality of objects based at least in part on the recorded state of the plurality of objects and the changes to the state of at least the subset of objects. In one embodiment, the computing device 103 may render the animation in a "backward" direction where the animation starts with the edited state of at least the subset of the objects and ends with the state of at least the subset of objects returning to the recorded state. In another embodiment, the computing device 103 may render the animation in a "forward" direction where the animation starts with the recorded state of the objects and ends with the one or more changes applied to the state of at least the subset of the objects to place the subset of the objects in the edited state. The direction of the animation may be a user input, as can be appreciated. Additionally, the animation rendered by the computing device 103 may occur for a period of time defined by an animation period 139. The animation period 139 may be configurable by a user input and each object in the animation environment may be associated with a separate animation period 139. Therefore, the forward and/or backward animation may occur at different times and/or at different speeds as defined by the location of the animation period 139 on a timeline of the animation environment and a length of the animation period 139.

Figure 12:
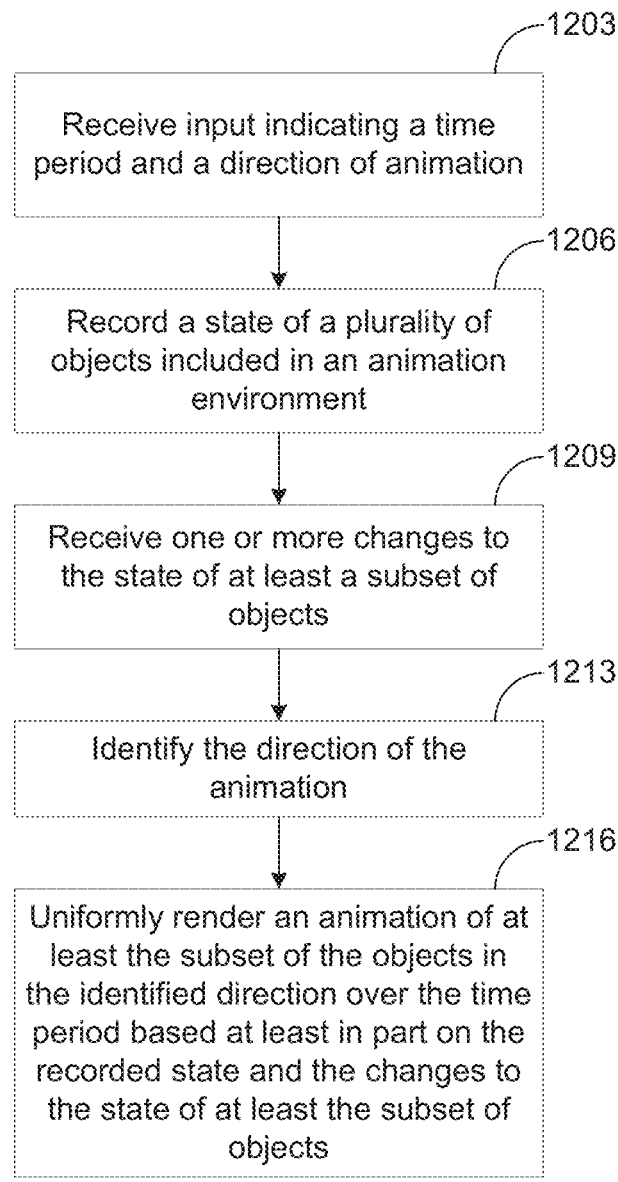
FIG. 12 is a flowchart depicting an example of the operation of a portion of the computing device according to certain embodiments.

FIG. 12 is a flowchart that provides one example of the operation of a portion of the computing device 103 according to certain embodiments. It is understood that the flowchart of FIG. 12 provides merely an example of the many different types of functional arrangements that may be employed to implement the operation of the portion of the computing device 103. As an alternative, the flowchart of FIG. 12 may be viewed as depicting an example of steps of a method implemented in the client device 106 according to one or more embodiments.

Beginning with step 1203, the computing device 103 receives an input indicating an animation period 139 and a direction 133 for the animation. In one embodiment, the computing device 103 receives a user input via an input device for placing an animation pin 129 on a timeline of an animation environment. Additionally, the computing device 103 receives an animation period 139 indicating a length of the animation to be performed. In some embodiments, the animation pin 129 may appear at the starting point and/or the ending point of the animation period 139. In other embodiments, the animation pin 129 may appear at some other location along the timeline other than the starting point and/or the ending point of the animation period 139. The direction 133 received by the computing device 103 indicates whether the animation to be performed starts with a recorded state of the objects in the animation environment or ends with the recorded state of the objects, as will be described.

Next, in step 1206, the computing device 103 records a state of a plurality of objects included in the animation environment thereby defining the recorded state of the animation. In one embodiment, the computing device 103 may record the state of the objects in response to receiving the input indicating the animation period 139 and the direction 133 of the animation. The state of the objects in the animation environment comprises values of properties 136 associated with the objects. For example, the computing device 103 may record values of properties 136 such as an x-axis value or a y-axis value describing the location of an object. Other properties 136 describing the state of the object may include a color, a size, a font type, and/or other properties describing the object.

In step 1209, the computing device 103 receives one or more changes to the state of at least a subset of the objects in the animation environment that defines the edited state of the animation. In one embodiment, the changes to the state may be a change in a value of one of the properties 136 of the objects in the animation environment. The computing device 103 may receive the change via a user input. For example, the user input may comprise dragging one of the objects to a different location in the animation environment thereby changing an x-axis and/or a y-axis value of the object. The user input may also comprise one or more manipulations of certain user interface components of the animation environment that reflect one or more values of properties 136 of the objects.

Next, in step 1213, the computing device 103 identifies a direction 133 of the animation. For example, the user may indicate to start the animation with the recorded state of the objects and end the animation with the edited state where the received changes to the state of the objects are gradually applied to the objects to perform the animation. As another example, the user may indicate to start the animation with the edited state and end the animation with the recorded state where the received changes to the state of the objects are gradually returned to the recorded state to perform the animation. In one embodiment, the direction 133 may be a "backward" and/or "forward" direction and/or may have another nomenclature defined by the computing device 103.

Then, in step 1216, the computing device 103 uniformly renders the animation of at least the subset of the objects in the identified direction 133 over the animation period 139 based at least in part on the recorded state and the edited state of at least the subset of objects. In one embodiment, if the direction 133 indicates to start the animation with the recorded state, the computing device 103 renders the animation such that the state of the objects exhibit the recorded state of the objects and then uniformly applies the received changes to the state for at least the subset of changes to place at least the subset of objects in the edited state. For example, the computing device 103 renders the animation such that the received changes to the state of at least the subset of objects is applied in a gradual and uniform manner over the animation period 139 such that by subset of objects exhibits the received changes to the state at the end of the animation period 139. The rate of the application of the received changes to the subset of objects may be based on a degree and/or magnitude of the received changes and a length of the animation period 139, as can be appreciated.

In another embodiment, if the direction 133 indicates to end the animation with the recorded state, the computing device 103 renders the animation such that the subset of objects embody the edited state at the start of the animation. The computing device 103 then renders the animation such that the state of the subset of objects is uniformly returned to the recorded state of the objects by the end of the animation. For example, the computing device 103 renders the animation such that the received changes to the state of at least the subset of objects is returned to the recorded state in a gradual and uniform manner over the animation period 139 such that the subset of objects exhibit the recorded state at the end of the animation period 139.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
   displaying, by an animation application executed with a processor, content in a content editing environment configured to edit the content;
   receiving, by the animation application, an indication of a location for an animation pin on a timeline associated with the content editing environment and of a duration for animating the content relative to the location;
   determining, by the animation application, a state of the content based on the content being displayed in the content editing environment, the state of the content comprising a value associated with a property of the content as displayed;
   recording, by the animation application in response to receiving the indication of the location for the animation pin, the state of the content to generate a recorded state of the content, the recorded state of the content associating the state with a first time on the timeline and comprising the value associated with the property of the content, the first time automatically determined based on the location for the animation pin;
   receiving, by the animation application, a user input indicating an edit to the state of the content;

generating an edited state based on the user input, the edited state associating the edit to the state with a second time on the timeline, the second time automatically determined based on the first time and the duration; and defining, by the animation application based on the recorded state and the edited state, an animation of the content for the duration and relative to the location for the animation pin on the timeline.

2. The method of claim 1 further comprising rendering the animation pin at the location on the timeline and an graphical indicator for an animation period on the timeline.

3. The method of claim 1 further comprising:
receiving an indication of a direction of the animation; and
defining the animation of the plurality of the objects based on the direction of the animation.

4. The method of claim 1, wherein the defining the animation comprises:
determining whether a direction of the animation indicates to end the animation at the animation pin;
responsive to the determination that the animation ends at the animation pin, starting the animation with the plurality of changes to the state of the content applied to the content and ending the animation by returning the content to the recorded state of the content.

5. The method of claim 4, wherein the animation begins at an end point of the animation period responsive to the determination that the animation ends at the animation pin.

6. The method of claim 1, wherein the defining the animation comprises:
determining whether a direction of the animation indicates to start the animation at the animation pin;
responsive to the determination that the animation starts at the animation pin, starting the animation with the content exhibiting the recorded state of the content and ending the animation by applying the edited state of the content.

7. The method of claim 6, wherein the animation ends at an end point of the animation period responsive to the determination that the animation starts at the animation pin.

8. The method of claim 1, wherein a length associated with the animation period is configurable.

9. The method of claim 1, wherein the animation of the content comprises adjusting the state of the content uniformly over the length of the animation period.

10. A non-transitory computer readable medium comprising instructions that, when executed with a processor, cause a system to perform operations comprising:
rendering, by an animation application executed with the processor, a plurality of objects in an animation environment;
receiving, by the animation application, an input indicating a location of an animation pin on a timeline associated with the animation environment, a time period for an animation to be performed on the plurality of objects included in the animation environment, and a direction of the animation to be performed during a length of the time period;
determining, by the animation application, a state of the plurality of objects based on the plurality of objects being rendered in the animation environment;
recording, by the animation application in response to receiving the input indicating the location of the animation pin, the state of the plurality of objects to generate a recorded state of the plurality of objects associated with the location of the animation pin;
receiving a plurality of changes to the state of the plurality of objects; and
rendering the animation based at least in part on the recorded state, the plurality of changes to the state, and the direction of the animation.

11. The non-transitory computer readable medium of claim 10, wherein the rendering the animation further comprises:
determining if the direction of the animation is in a backward direction;
responsive to the determination that the direction of the animation is in the backward direction, rendering the animation to start with the plurality of changes applied to the state of the plurality of objects and to end with the state of the plurality of objects returning to the recorded state.

12. The non-transitory computer readable medium of claim 11, wherein the state of the plurality of objects returns to the recorded state uniformly over a length of the time period.

13. The non-transitory computer readable medium of claim 10, wherein the rendering the animation further comprises:
determining if the direction of the animation is a forward direction;
responsive to the determination that the direction of the animation is in the forward direction, rendering the animation to start with the recorded state of the plurality of objects and end with the plurality of changes applied to the state of the plurality of objects.

14. The non-transitory computer readable medium of claim 13, wherein the plurality of changes are applied to the state of the plurality of objects uniformly over a length of the time period.

15. The non-transitory computer readable medium of claim 10, wherein the animation of the plurality of objects starts or stops at the location of the animation pin.

16. The non-transitory computer readable medium of claim 10, wherein the state of the plurality of objects comprises at least one value associated with a plurality of properties of the plurality of objects.

17. A system comprising:
a processor;
a non-transitory computer readable medium storing instructions that, upon execution by the processor, cause the system to:
display an object in an animation environment;
determine a state of the object based on the object being displayed in the animation environment;
receive a first input indicating a location of an animation pin on a timeline of the animation environment, a time period for an animation to be performed on the object, and a direction of the animation during a length of the time period;
record, in response to the first input, the state of the object in the animation environment to generate a recorded state of the object, the recorded state associated with the location of the animation pin;
receive a second input indicating a change to the state of the object; and
define the animation of the object over the time period based on the recorded state, the change to the state of the object, and the direction of the animation.

18. The system of claim 17, wherein defining the animation of the object comprises:
determining whether the direction of the animation is a backward direction;
responsive to the determination that the direction of the animation is the backward direction, defining the animation over the time period to start with the change applied to the object and to end with the recorded state of the object.

19. The system of claim 17, wherein defining the animation of the object comprises:
    determining whether the direction of the animation is a forward direction;
    responsive to the determination that the direction of the animation is the forward direction, defining the animation over the time period to start with the recorded state of the object and applying the change to the object.

* * * * *